US007657147B2

(12) United States Patent
Bonitatibus et al.

(10) Patent No.: US 7,657,147 B2
(45) Date of Patent: Feb. 2, 2010

(54) SUNLIGHT SIMULATOR APPARATUS

(75) Inventors: Michael H. Bonitatibus, Glenside, PA (US); Barry E. Barsky, Havertown, PA (US)

(73) Assignee: Solar Light Company, Inc., Glenside, PA (US)

( * ) Notice: Subject to any disclaimer, the term of this patent is extended or adjusted under 35 U.S.C. 154(b) by 0 days.

(21) Appl. No.: 11/366,272

(22) Filed: Mar. 2, 2006

(65) Prior Publication Data

US 2007/0206901 A1 Sep. 6, 2007

(51) Int. Cl.
G02B 6/00 (2006.01)
(52) U.S. Cl. .................................. 385/133; 385/147
(58) Field of Classification Search ............. 606/15, 606/16; 600/182, 183, 310; 604/20, 21; 607/88–95; 385/48, 133, 147
See application file for complete search history.

(56) References Cited

U.S. PATENT DOCUMENTS

| | | | |
|---|---|---|---|
| 3,890,033 A | 6/1975 | McGee | |
| 4,460,832 A | 7/1984 | Bigham | |
| 4,933,813 A * | 6/1990 | Berger | 362/2 |
| 5,059,013 A * | 10/1991 | Jain | 359/503 |
| 5,521,392 A | 5/1996 | Kennedy et al. | |
| 6,027,237 A | 2/2000 | Riser et al. | |
| 6,393,042 B1 | 5/2002 | Tanaka | |
| 6,447,537 B1 * | 9/2002 | Hartman | 607/94 |
| 6,508,813 B1 | 1/2003 | Altshuler | |
| 6,577,380 B1 | 6/2003 | Sposili et al. | |
| 6,796,697 B1 | 9/2004 | Bragg et al. | |
| 7,144,248 B2 * | 12/2006 | Irwin | 433/29 |
| 2004/0030368 A1 * | 2/2004 | Kemeny et al. | 607/88 |
| 2005/0015124 A1 * | 1/2005 | Irwin | 607/94 |
| 2005/0226585 A1 | 10/2005 | Abu-Ageel | |

OTHER PUBLICATIONS

Hamamatsu advertisement for "Light Beam Distribution/Direct Beam Uniform Illumination Unit" published before Mar. 2, 2006.
Jeffrey M. Gordon et al "Toward ultrahigh-flux photovoltaic concentration" Applied Physics Letters Apr. 26, 2004 pp. 1, 2 and 3 vol. 84 No. 17.

* cited by examiner

*Primary Examiner*—Uyen-Chau N Le
*Assistant Examiner*—Rhonda S Peace
(74) *Attorney, Agent, or Firm*—Barley Snyder LLC

(57) ABSTRACT

Sunlight simulators that have optical homogenizer units that provide adjustably positionable beams of radiation, each within a selected portion of the spectrum of wave lengths of radiation emitted from a light source, that have uniform output intensity profiles measured across the ends of the optical homogenizer units. These sunlight simulators include either liquid light guides or fiber optic light guides that conduct the beams of radiation, developed from the light source, to the optical homogenizer units. Dosage regulating means control the doses of radiation provided by the optical homogenizer units.

41 Claims, 8 Drawing Sheets

SUNLIGHT SIMULATOR APPARATUS

FIELD OF THE INVENTION

The present invention relates, in general, to simulating light and, in particular, to apparatus for simulating sunlight for sunburn studies, materials testing, component testing, and other purposes.

BACKGROUND OF THE INVENTION

The sunlight spectrum includes the ultraviolet, visible, and infrared light wavelength ranges. Various types of equipment have been developed that simulate one or more of these light frequency ranges and are used in performing various tests, for example, on humans or materials or components to determine the effect of these light wavelength ranges on humans or materials or components.

It is well known that exposure to ultraviolet radiation can cause adverse skin conditions, including skin cancers. The predominant source of the ultraviolet radiation is sunlight radiation. Various sunscreen formulations that are applied to the skin are available to reduce or eliminate the adverse effect of sunlight on humans and various equipments used in testing the effectiveness of such sunscreen formulations (i.e., the skin reactions to various ultraviolet doses) to determine the Sunscreen Protection Factor (SPF) are available.

Test apparatus of this type that is available at the present time includes an artificial light source that provides (a) a single beam of selected intensity focused upon a subject to test skin reaction to the intensity of the single beam of ultraviolet radiation, or (b) a plurality of beams of various selected intensities focused simultaneously upon a subject to test simultaneously skin reaction to the various intensities of the plurality of beams of ultraviolet radiation.

In general, the skin reaction test units that are currently available fail to satisfy a number of the requirements of the users of such units. Some fail to provide beams of radiation having the desired uniform output intensity profiles, so that often it is difficult for the user to properly quantify and qualify the test results. Some fail to provide the users of the test units with sufficient flexibility to conduct the types of tests the users would like to conduct in an easy and efficient manner that provide accurate and repeatable results.

Yet another problem with currently available skin reaction test units is the thermal discomfort that can be experienced by certain subjects during exposure that is caused by the presence of certain wavelengths in the radiation to which the subject is exposed. Despite efforts to eliminate, for example, infrared radiation from the lamp source by the inclusion, for example, of dichroic mirrors and blocking filters, the test subjects still can be exposed, under certain conditions, to an undesirable level of infrared radiation that is not eliminated from the beams of radiations to which the test subject is exposed and, thereby, be exposed to undesirable thermal discomfort.

As to test units that are available to determine the effect of sunlight on materials and components (e.g., photovoltaic cells), many are subject to the same general criticism set out above with respect to the skin reaction test units. Some fail to provide the user with test results that are properly quantified and qualified, while others lack the flexibility to conduct the types of tests the users would like to conduct in an easy and efficient manner that provide accurate results.

SUMMARY OF THE INVENTION

Accordingly, one sunlight simulator, constructed in accordance with the present invention, includes a housing, a light source positioned within the housing, and light collecting means for developing from radiation emitted from the light source a plurality of beams of radiation, each within a selected portion of the spectrum of wave lengths of radiation emitted from the light source. This sunlight simulator also includes a plurality of light guides, each positioned to receive individually from the light collecting means one of the beams of radiation, for conducting the beams of radiation away from the light collecting means. A plurality of optical homogenizer units, each positioned to receive individually from one of the light guides one of the beams of radiation, provide a plurality of adjustably positionable beams of radiation having uniform output intensity profiles measured across the ends of the optical homogenizer units. Dosage regulating means control the doses of radiation provided by the optical homogenizer units.

Another sunlight simulator, constructed in accordance with the present invention, includes a housing, a light source positioned within the housing, and light collecting means for developing from radiation emitted from the light source a beam of radiation within a selected portion of the spectrum of wave lengths of radiation emitted from the light source. This sunlight simulator also includes a fiber optic light guide positioned to receive from the light collecting means the beam of radiation for conducting the beam of radiation away from the light collecting means. An optical homogenizer unit, positioned to receive from the fiber optic light guide the beam of radiation, provides an adjustably positionable beam of radiation having a uniform output intensity profile measured across the end of the optical homogenizer unit. Dosage regulating means control the dose of radiation provided by the optical homogenizer unit.

Another aspect of the present invention is an optical homogenizer unit that includes an elongated tube of circular cross section, a multisided elongated optical homogenizer having a length equal to the length of the tube and positioned within the tube, and filler material in the spaces between the longitudinal surfaces of the optical homogenizer and the inner surface of the tube.

Yet another aspect of the present invention is dosage regulating apparatus for a sunlight simulator for controlling the doses of radiation developed by the sunlight simulator. This apparatus includes a sensor for monitoring the intensity of a beam of radiation developed by the sunlight simulator and control means responsive to the sensor for blocking the passage of the beam of radiation when the dose of radiation developed by the sunlight simulator reaches a preset level.

A further aspect of the present invention is attenuator apparatus for a sunlight simulator for controlling the intensity of a beam of radiation developed by the sunlight simulator. This apparatus includes an attenuator having through openings that vary in size to vary the intensity of a beam of radiation passing through the attenuator and means for moving the attenuator to selectively regulate the intensity of the beam of radiation passing therethrough.

A still further aspect of the present invention is a sunlight simulator probe that has a block adapted to contact the skin of a subject to which radiation from the probe is to be provided. The block includes a heat sink for relieving heat generated by artifact infrared radiation and heat dispelled by the block, an electrically polar oriented cooling source having a surface facing the subject and sensing means for developing an indication of the skin temperature of the subject for controlling the temperature of the cooling source, and a high dielectric polymer front cover having a high resistance to electrical transmission, high thermal conductivity, and a window through which the sensing means in the cooling source are exposed to the skin of the subject. This probe further includes means responsive to the sensing means for controlling the temperature of the cooling source.

DETAILED DESCRIPTION OF THE INVENTION

Figure 1:
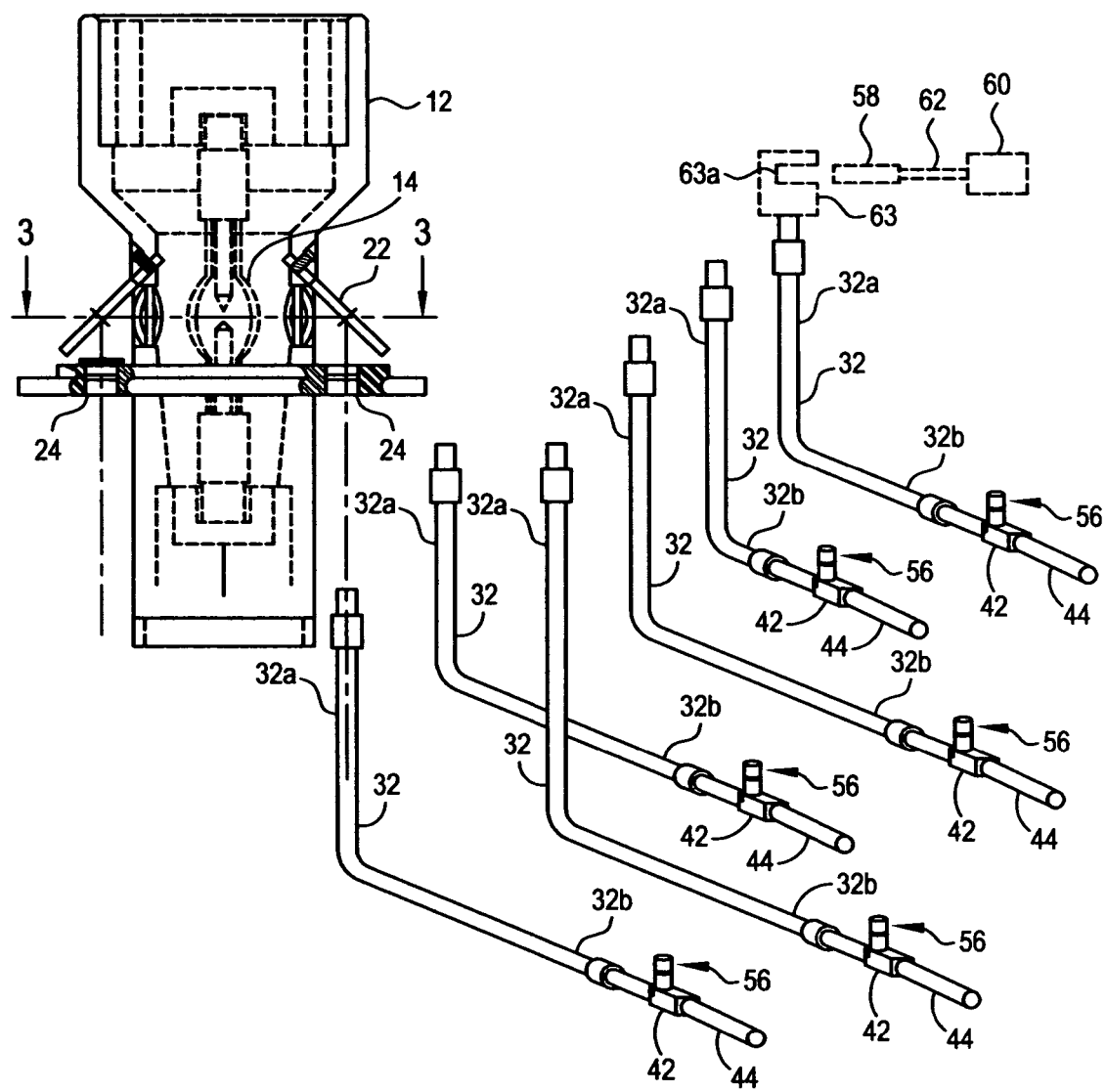
FIG. 1, partially in cross-section and partially in exploded perspective, illustrates a first embodiment of a sunlight simulator, constructed in accordance with the present invention, in which the light guides are liquid light guides.

In the drawings, like reference numerals represent like elements.

Referring to FIGS. 1, 2, 3, and 4, a sunlight simulator, constructed in accordance with the present invention, includes a housing 12 and a light source 14 positioned within housing 12. For the embodiment of the invention illustrated, housing 12 is cylindrical, having an upper portion 12a and a lower portion 12b, and is substantially light tight except as hereinafter described to allow the escape of light in a controlled manner.

Light source 14 is disposed in the upper portion 12a of housing 12 along the central axis 12c of the housing. Light source 14 is an artificial light source, preferably a xenon short arc lamp or such other high intensity lamp, that emits a substantial amount of radiation, including radiation in the ultraviolet range.

Also included in a sunlight simulator, constructed in accordance with the present invention, are light collecting means for developing from radiation emitted from lamp 14 a plurality of beams of radiation, each within a selected portion of the spectrum of wave lengths of radiation emitted from the lamp. As will be understood from further description below of the present invention, the intensity of each beam of radiation developed by the light collecting means is individually and selectively adjustable.

Figure 2:
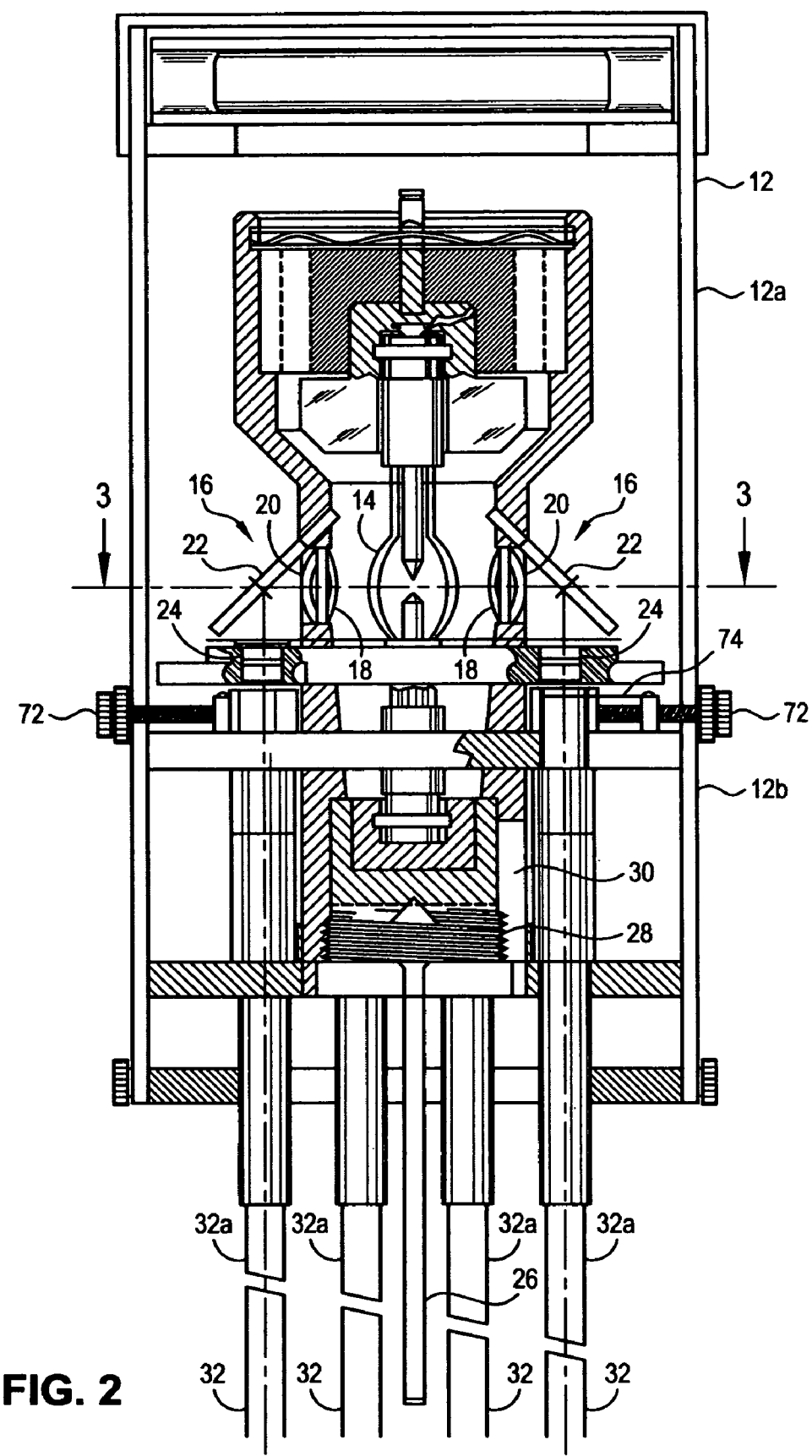
FIG. 2 is a cross-sectional view that illustrates a portion of the FIG. 1 sunlight simulator on an enlarged scale and in greater detail.
Figure 3:
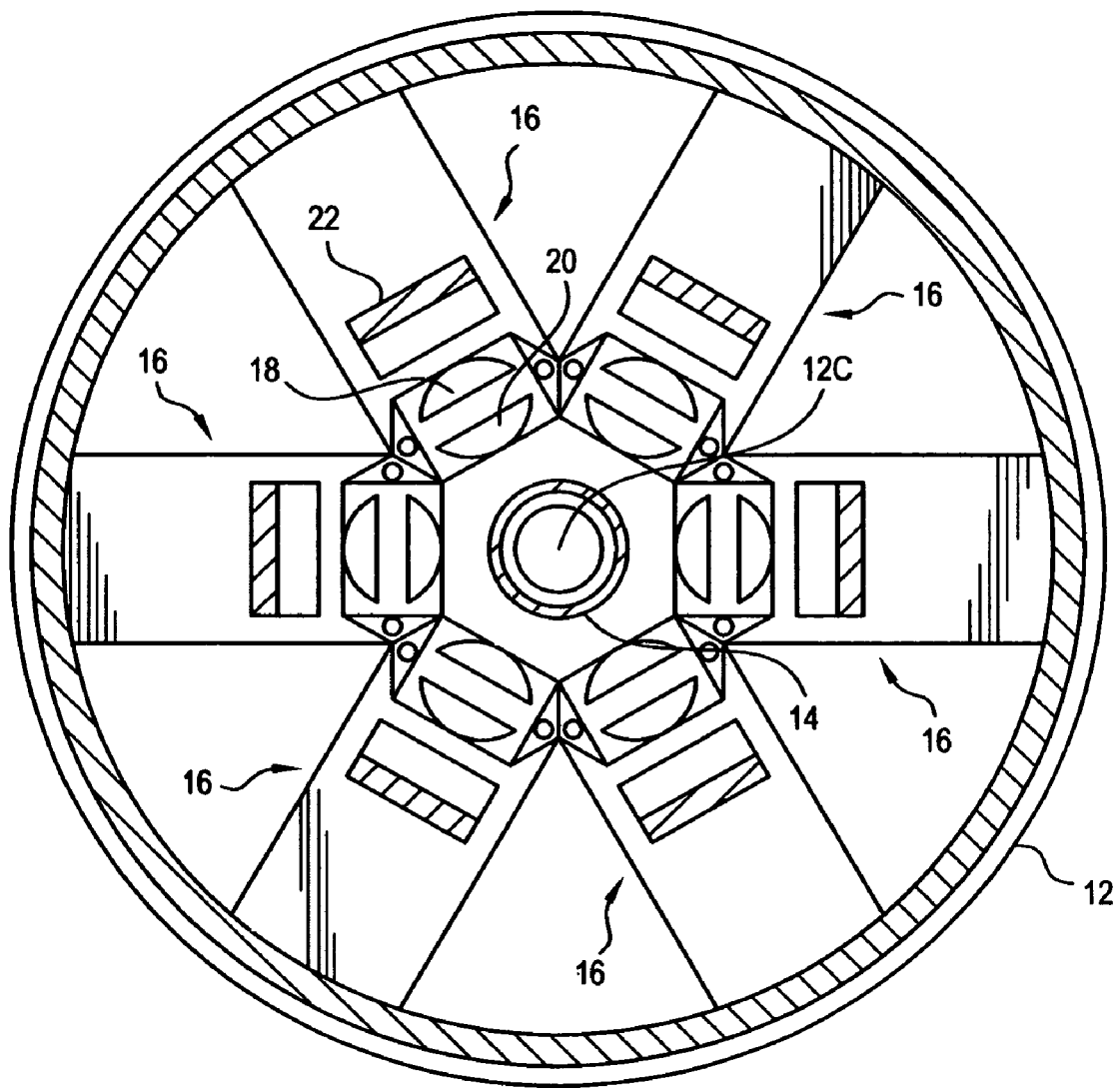
FIG. 3 is a cross-sectional view taken along lines 3-3 of FIGS. 1 and 2.

In the embodiment of the present invention illustrated in FIGS. 1, 2, and 3, the light collecting means surround lamp 14 and include a plurality of light collecting assemblies 16 that are positioned radially outward from lamp 14. In particular, each light collecting assembly 16 includes a collimating lens assembly, composed of a pair of opposed convex lenses 18 and 20 for the embodiment of the present invention illustrated, that is spaced radially outward from lamp 14. A single lens that performs the collimating function may be substituted for the pair of opposed convex lenses 18 and 20. Each collimating lens assembly directs a portion of the radiation emitted from lamp 14 radially outward.

Each light collecting assembly 16 also includes a mirror 22 associated with the collimating lens assembly and in substantial radial alignment with the associated collimating lens assembly. Each mirror 22 is substantially equidistantly spaced from the associated collimating lens assembly. Preferably, each mirror 22 is a dichroic mirror and, as best illustrated in FIGS. 1 and 2, is disposed at an angle with respect to the radius of lamp 14, which is 45° for the embodiment of the present invention being described. The collimating lens assemblies and associated mirrors are equally spaced apart radially around lamp 14 and equally spaced outwardly from the lamp.

Each mirror 22 reflects vertically downward, in a path substantially parallel to central axis 12c of housing 12, only a portion of the spectrum of optical energy directed to the mirror from the associated collimating lens assembly. For the embodiment of the present invention being described, dichroic mirrors 22 predominantly reflect ultraviolet radiation vertically downward, while other portions of the spectrum are transmitted onto the inner surface of the housing that serves as a heat sink. As a result, for the embodiment of the present invention being described, six parallel and equidistantly spaced beams of ultraviolet radiation are provided by the apparatus thus far described.

For the sunlight simulator being described, the light collecting means, preferably, further include a plurality of blocking filters 24, one associated with each dichroic mirror 22 and in the path of the radiation reflected by the associated dichroic mirror, for removing short ultraviolet radiation (below 290 nm) and blocking visible and infrared radiation (above 400 nm) from the beams of radiation reflected from the dichroic mirrors.

The preferred embodiment of the present invention that is illustrated in FIGS. 1, 2, and 3 has six light collecting assemblies surrounding lamp 14 that develop six beams of ultraviolet radiation. It will be understood that a different number of light collecting assemblies may be used and that the number of light collecting assemblies chosen is a design choice that is determined by the particular application of the present invention as are other choices of design.

Lamp 14, preferably, is adjustable, relative to the light collecting assemblies 16, in the X and Y (radial) directions and in the Z (axial) direction. In FIG. 2, there are illustrated a shaft 26 and a threaded member 28, in threaded engagement with a block 30 mounted in the bottom portion 12b of housing 12, for aligning lamp 14 in the Z (axial) direction. Similar means (not shown) may be provided for radial alignment of lamp 14 in the X and Y (radial) directions.

The sunlight simulators illustrated in FIGS. 1 through 4 also include a plurality of light guides, each positioned to receive individually from the light collecting means one of the beams of radiation, for conducting the beams of radiation away from light collecting means. For the embodiment of the present invention illustrated in FIGS. 1, 2, and 3, the light guides are liquid light guides 32. For the embodiment of the present invention illustrated in FIG. 4, the light guides are fiber optic light guides 34.

Figure 4:
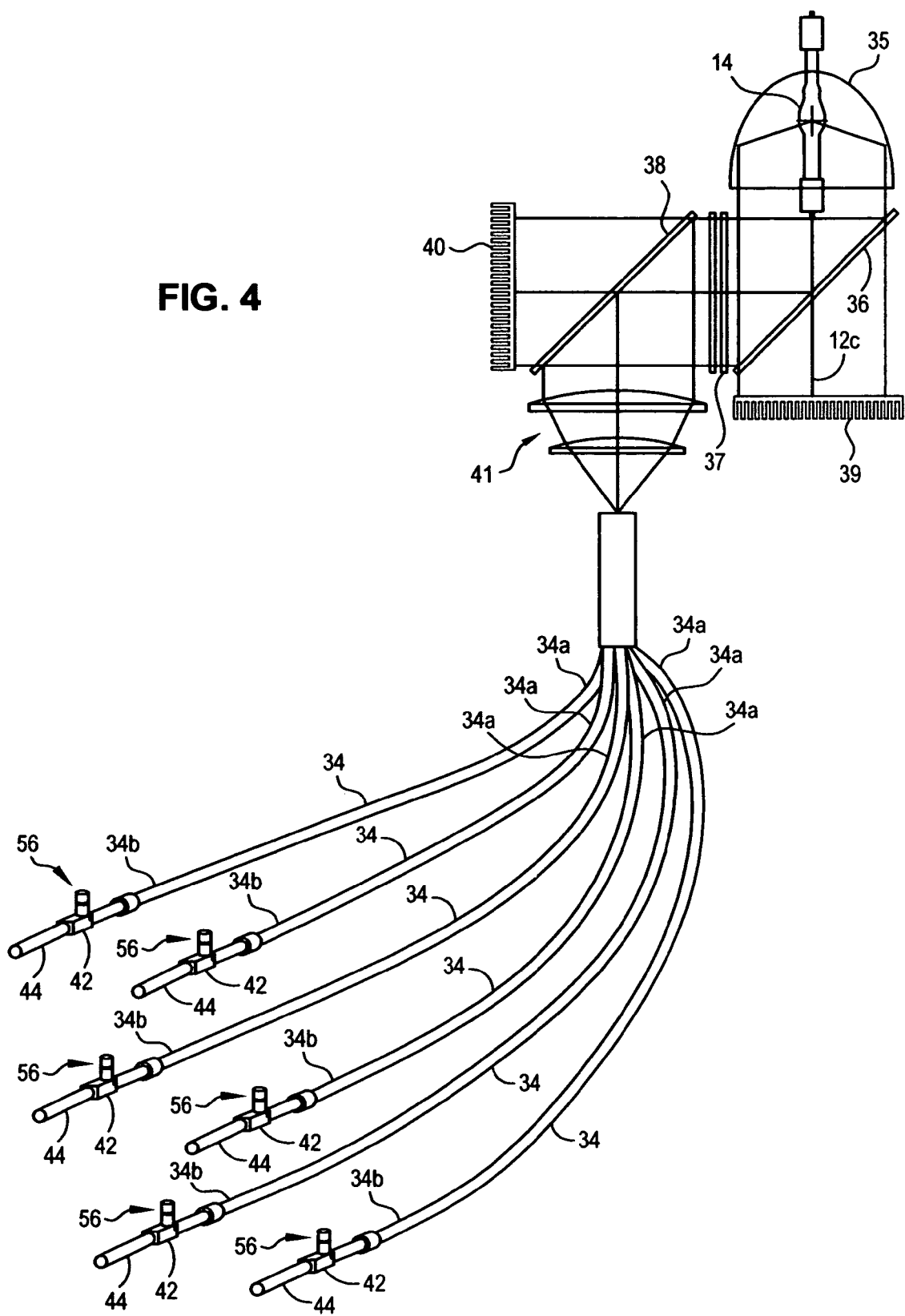
FIG. 4, partially in cross-section and partially in exploded perspective, illustrates a second embodiment of a sunlight simulator, constructed in accordance with the present invention, in which the light guides are fiber optic light guides.

In the FIG. 4 embodiment of the present invention, in which the light guides are fiber optic light guides, the light collecting means include a parabolic or ellipsoidal reflector 35 for reflecting the radiation emitted from lamp 14 to a first dichroic mirror 36, disposed at an angle of 45° with respect to the axis of the lamp, which, in turn, predominantly reflects ultraviolet radiation reflected from the reflector through a blocking filter 37 to a second dichroic mirror 38 which also is disposed at an angle of 45° with respect to the axis of the lamp and reflects ultraviolet radiation reflected from dichroic mirror 36 further reducing the proportion of infrared and visible radiation in the beam. Other portions of the spectrum are transmitted onto heat sinks 39 and 40. Also included in the light collecting means of this embodiment of the present invention is a collimating lens assembly 41.

The preferred embodiment of the present invention that is illustrated in FIG. 4 has light collecting means that develop a single beam of ultraviolet radiation that is split into six beams of ultraviolet radiation at the input ends 34a of six fiber optic light guides which, for this embodiment of the present invention, are considered parts of the light collecting means. It will be understood that a different number of fiber optic light guides may be used and that the number of fiber optic light guides that are chosen is a design choice that is determined by the particular application of the present invention as are other choices of design.

Figure 5A:
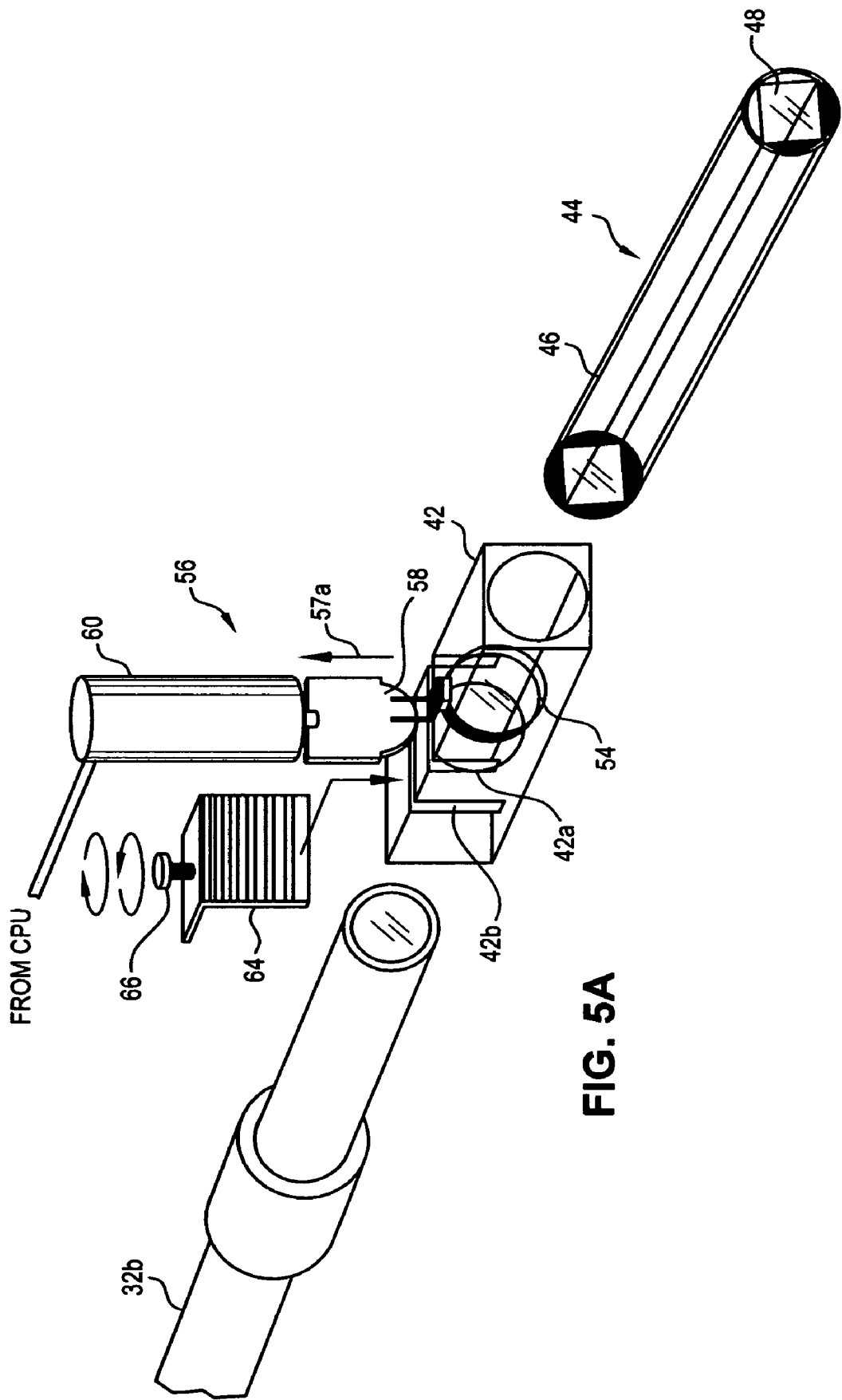
FIGS. 5A and 5B are exploded perspective views that illustrate portions of the FIG. 1 sunlight simulator and the FIG. 4 sunlight simulator on an enlarged scale and in greater detail and at different stages of operation of the dosage regulating apparatus and attenuator apparatus of the present invention.
Figure 5B:
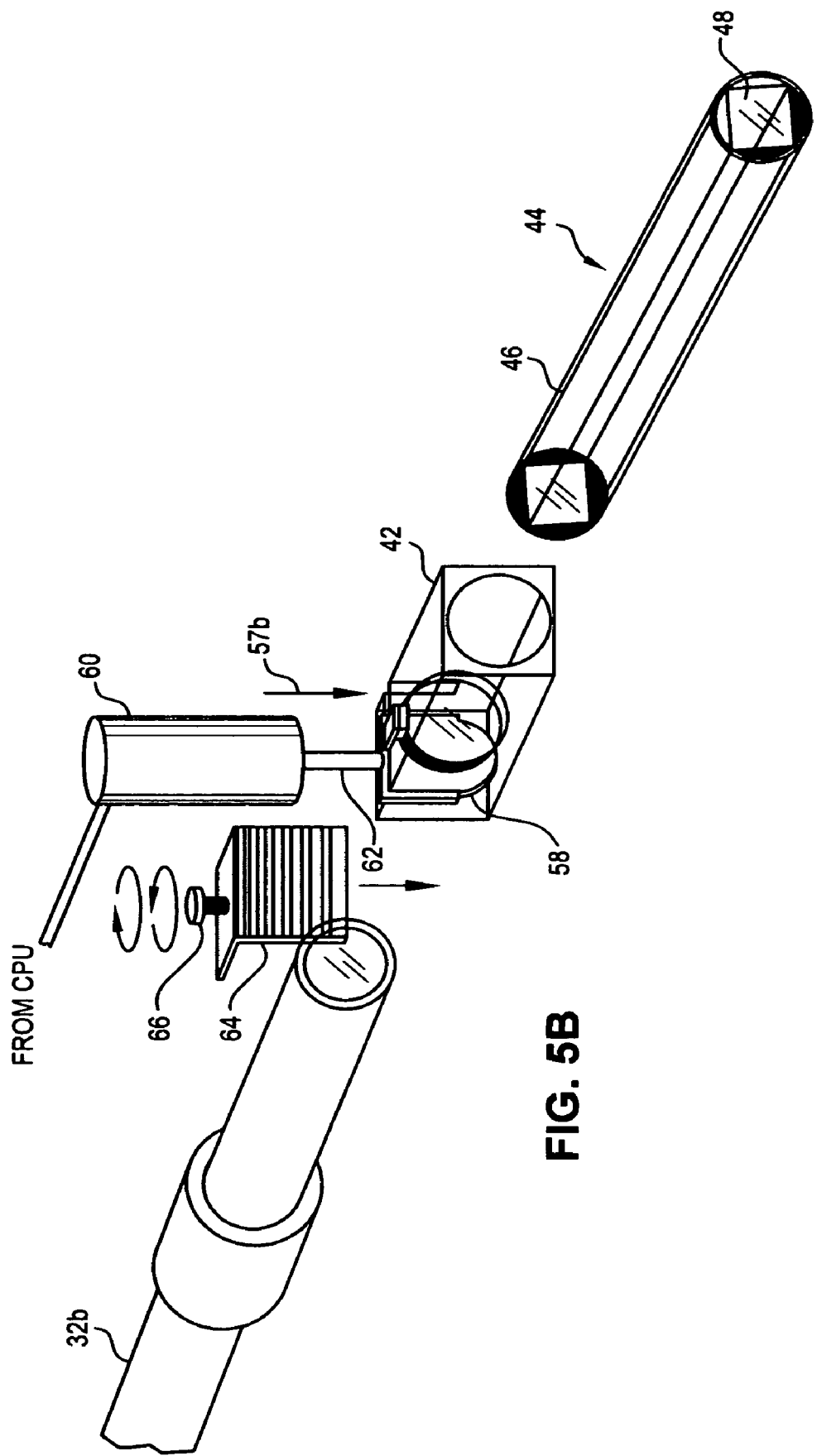

Liquid light guides 32 in the FIGS. 1, 2, and 3 embodiment and fiber optic light guides 34 in the FIG. 4 embodiment conduct the beams of radiation away from the light collecting means. As shown in FIGS. 1, 5A and 5B, the output ends 32b of liquid light guides 32 are individually connected to a plurality of blocks 42 and, as shown in FIG. 4, the output ends 34b of fiber optic light guides 34 are individually connected to a plurality of blocks 42.

A sunlight simulator, constructed in accordance with the present invention, further includes a plurality of optical homogenizer units 44, each positioned to receive individually from one of the light guides (liquid light guides 32 in FIGS. 1 and 2 or fiber optic light guides 34 in FIG. 4) one of the beams of radiation, for providing a plurality of adjustably positionable beams of radiation having uniform output intensity profiles measured across the ends of the optical homogenizer units. Optical homogenizer units 44 are connected to the opposite ends of blocks 42 from the output ends of the light guides.

Figure 6:
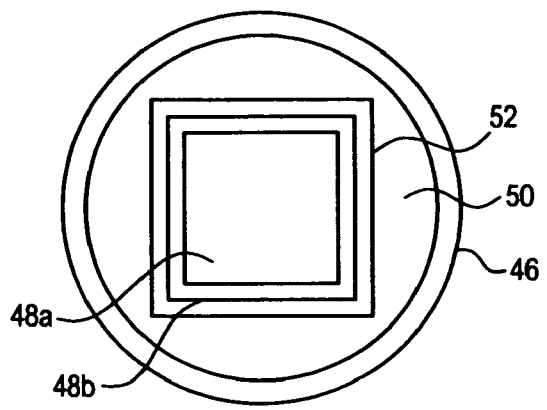
FIG. 6 is a cross-sectional view of an optical homogenizer unit constructed in accordance with the present invention.

As shown most clearly in FIGS. 5A, 5B, and 6, each optical homogenizer unit 44 includes an elongated tube 46 having, for example, a circular cross-section and a multisided elongated optical homogenizer 48 having a length equal to the length of tube 46. Tube 46 is made of a biologically compatible material, for example stainless steel. Optical homogenizer 48 is positioned within tube 46 and, preferably, is made of a suitable quartz material core member 48a (e.g., fused silica) having an evaporated aluminum coating 48b deposited on the longitudinal surfaces of the core member. The evaporated aluminum coating 48b serves to internally reflect the radiation as it passes through the length of core member 48a.

The spaces between the longitudinal surfaces of optical homogenizer 48 and the inner surface of tube 46 are filled with a suitable filler material 50, such as a medical grade sealing material, to fix the position of optical homogenizer in the tube. A suitable epoxy sealer layer 52, preferably, is applied over the evaporated aluminum coating 48b of optical homogenizer 48 to protect the evaporated aluminum coating.

While optical homogenizer 48 is illustrated as having a square cross-section, it may take other shapes dependent on the application of the sunlight simulator. Likewise, the choice of materials used to form optical homogenizer 48 is dependent on the application of the sunlight simulator.

Figure 7:
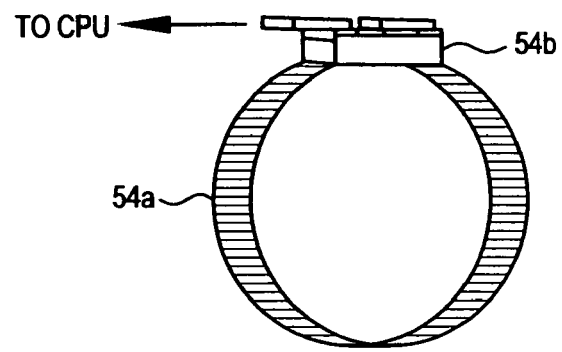
FIG. 7 is a perspective view of an optical quartz disc that serves as a sensor in the dosage regulating apparatus of the present invention.

A sunlight simulator, constructed in accordance with the present invention, further includes dosage regulating means for controlling the doses of radiation provided by optical homogenizer units 44. For the embodiment of the invention as illustrated in FIGS. 5A, 5B, and 7, the dosage regulating means include a sensor 54, mounted in one of the blocks 42 transverse to the beam of radiation passing to the associated optical homogenizer unit 44, for monitoring the intensity of the beam of radiation received by one of the optical homogenizer units 44 and control means responsive to the sensor for individually blocking the passage of each beam of radiation received by the optical homogenizer units when each dose of the radiation provided by each optical homogenizer unit reaches a preset level. For the embodiment of the present invention being described, the control means of the dosage regulating means include a plurality of shutter assemblies 56, one associated with each of the optical homogenizer units 44. Each shutter assembly includes a shutter 58 that is movable, as indicated by arrows 57a and 57b, into and out from a first recess 42a that extends across block 42 transverse to the beam of radiation. Shutter 56 is movable between a first position, as illustrated in FIG. 5A, at which the beam of radiation is allowed to pass to optical homogenizer unit 44 and second position, as illustrated in FIG. 5B, at which the beam of radiation is blocked from passing to the optical homogenizer unit. Each shutter assembly 56 also includes a solenoid 60 and a solenoid plunger 62 to which shutter 58 is affixed, so that when the solenoid is deactuated and the solenoid plunger is permitted to move out of the solenoid, the shutter moves from the first position illustrated in FIG. 5A to the second position illustrated in FIG. 5B. When solenoid 60 is actuated, the solenoid plunger is urged to move back into the solenoid and shutter 58 moves from the position illustrated in FIG. 5B to the position illustrated in FIG. 5A.

Solenoid 60 can be arranged with permanent magnets in mutual repulsion forcing shutter 58 downwardly into a default position to block the beam of radiation. Permanent magnets having like poles in opposition produce a magnetic force causing the magnets to repulse each other. The magnetic attractive force of an actuated solenoid that maintains shutter 58 in the upper position is stronger than the mutual repulsive force of the permanent magnets when solenoid 60 is actuated. When the solenoid 60 is deactuated, it no longer maintains shutter 58 in the retracted or upper position and the repulsing force between the opposing permanent magnets forces the shutter to move downward and assume the default or blocked position.

Sensor 54, preferably, is a plano-plano quartz blank 54a which may be circular, as illustrated in FIG. 7, or square or any appropriate shape that has the prescribed area and thickness. The optically flat and parallel opposing major faces of the plano-plano quartz blank 54a should be polished to full optical clarity and be devoid of any coloration, pigmentation, and shading and have a low surface RMS. The edge surfaces of plano-plano quartz blank 54a preferably are polished with the edge surfaces being 90° to the face surfaces and coated with aluminum mirror material. If circular, the plano-plano quartz blank 54a should have one area of the circumferential edge a chord that is polished and has sufficient flat area to receive a photosensor 54b that develops a signal representative of the intensity of the beam of radiation passing through the sensor.

The control means of the dosage regulating means also include means responsive to sensor 54 for individually actuating solenoids 60 to move shutters 58 to the second positions to block the beams of radiation passing through shutter assemblies 56 when the doses of radiation provided by the associated optical homogenizer units 44 reach the preset levels. The control means may be a central processing unit (CPU) that receives signals from sensor 54 that are representative of the intensity of the beam of radiation passing through the sensor and integrates over time the amount of radiation passing through the sensor. When the total radiation passing through the sensor reaches a preset level, the CPU energizes solenoid 60 which, in turn, drives solenoid plunger 62 and shutter 58 away from the solenoid (downward as illustrated in FIGS. 5A and 5B) from the position illustrated in FIG. 5A to the position illustrated in FIG. 5b to block the beam of radiation passing through shutter assembly 56.

In one embodiment of the present invention, a single sensor 54 associated with one of the shutter assemblies 56 serves to actuate shutter 58 with which it is associated and the other shutters 58 in the other shutter assemblies 56. This can be accomplished by determining, in advance, the intensities of the beams of radiation developed by the light collecting means, entering data representative of the relative beam intensities in the CPU, and programming the CPU to actuate solenoids 60 individually at the appropriate times based on the radiation dosage determined by the CPU from the signals received from sensor 54.

In a second embodiment of the present invention, the dosage regulating means includes a plurality of sensors 54, one mounted in each block 42, which are individually associated with each shutter assembly 56, for individually monitoring the intensities of the beams of radiation. The CPU integrates individually over time the amount of radiation passing through each sensor 54 and individually actuates each solenoid 60 in the associated shutter assembly 56.

In a third embodiment of the dosage regulating means that functions without any sensor for monitoring the intensity of any of the beams of radiation, shutters 58 block the beams of radiation at prescribed times that are programmed in the CPU. The CPU functions as a timing circuit that individually actuates solenoids 60 at times determined in advance that are based on determining, in advance, the intensities of the beams developed by the light collecting means.

Instead of locating shutters 58, solenoids 60, and solenoid plungers 62 between the light guides and the optical homogenizer units (i.e., at the output ends of the light guides), the shutters, solenoids, and solenoid plungers can be located between the light collecting means and the light guides (i.e., at the input ends of the light guides) as shown by dashed lines in FIG. 1. With shutters 58, solenoids 60, and solenoid plungers 62 located as illustrated by the dashed lines in FIG. 1, a solenoid, when deactuated, permits the associated solenoid plunger and shutter to move into a recess 63a in a block 63 and, when the solenoid is actuated, the associated solenoid plunger and shutter are urged to move out of recess 63a to regulate the dosage of radiation delivered by the associated homogenizer unit.

A sunlight simulator, constructed in accordance with the present invention, preferably further includes attenuator means for individually and selectively regulating the intensity of each of the beams of radiation developed by the light collecting means. In one preferred embodiment of the present invention, the attenuator means include a plurality of individual attenuators 64, one for each beam of radiation developed by light collecting means, with each attenuator disposed either between one of the light guides and one of the optical homogenizer units as illustrated in FIGS. 5A and 5B, or between one of the light collecting assemblies and one of the light guides, as illustrated in FIG. 2.

Referring to FIGS. 5A and 5B, each attenuator 64 is movable within a second recess 42b (not shown in FIG. 5B) that extends across block 42 transverse to the beam of radiation. The penetration of each attenuator 64 in one of the recesses 42b is individually adjustable, for example by the turning of a thumb screw 66 having a point end that bears against block 42, to selectively restrict the amount of radiation received by the associated optical homogenizer unit.

Figure 8:
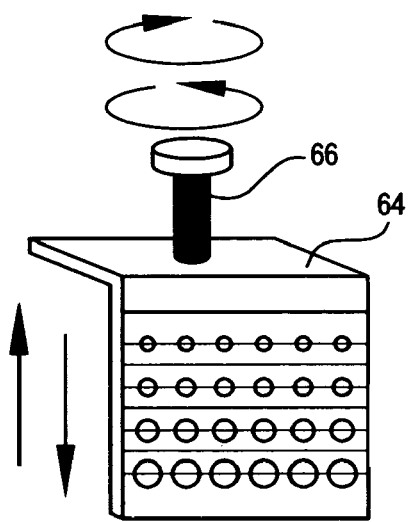
FIG. 8 is a perspective view of a second form of an attenuator for use in the attenuator apparatus illustrated in FIGS. 5A and 5B.

One form of an attenuator that can be used in the present invention is illustrated by FIGS. 5A and 5B. This attenuator has through openings that vary in size to vary the intensity of a beam of radiation passing through the attenuator as the penetration of the attenuator into the recess 42b in block 42 is adjusted. As illustrated by FIGS. 5A and 5B, one form of an attenuator 64 has opaque horizontal bars that are separated by open horizontal spaces that decrease in width moving along a length of the attenuator from bottom to top. In another form of attenuator 64 as illustrated in FIG. 8, the open spaces are horizontal rows of circular openings with the diameters of the openings decreasing moving along a length of the attenuator from bottom to top.

Figure 9A:
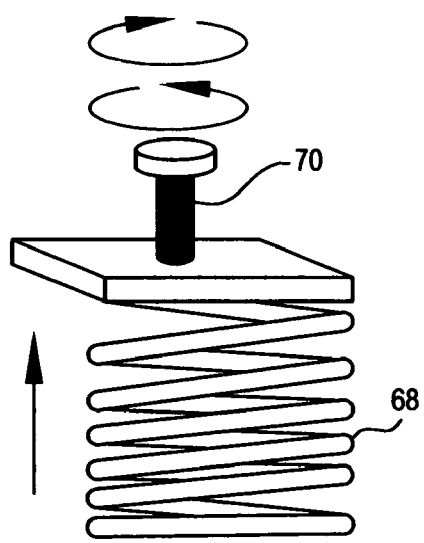
FIGS. 9A and 9B are perspective views of a third form of an attenuator for use in the attenuator apparatus illustrated in FIGS. 5A and 5B at different stages of operation of the of the shutter.
Figure 9B:
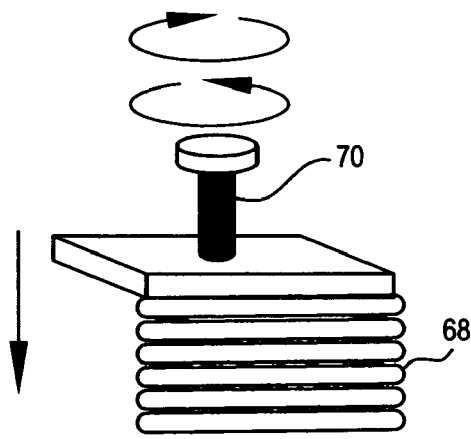

An alternative form of an attenuator is illustrated by FIGS. 9A and 9B. This embodiment of the attenuator includes a spring 68 that is positioned in recess 42b in block 42. Spring 68 is compressible and expandable within recess 42b to vary the space between the sectors of the spring. Spring 68 is compressed and expanded by the turning of a thumb screw 70 having a point end that bears against block 42 to selectively restrict the amount of radiation received by the associated optical homogenizer unit.

It is apparent from the foregoing that an attenuator that can be used in a sunlight simulator constructed in accordance with the present invention can take a variety of forms. Besides those attenuators that have been described above that have open spaces that decrease in size moving along a length of the attenuator from bottom to top (e.g., FIGS. 5A, 5B, and 8) and those that have uniform size open spaces (e.g., FIGS. 9A and 9B), the open spaces may decrease in size and then increase in size moving along the length of the attenuator. A major consideration in selecting the form of the attenuator is the nature of the associated optical homogenizer unit and the nature of the beam of radiation that is received by the associated optical homogenizer unit.

As indicated in FIG. 2, the attenuator means can be disposed between the light collecting means and the light guides. In FIG. 2, thumb screws 72 individually control the positions of attenuators 74.

Also, instead of setting the positions of attenuators 74 manually, for example, by thumb screws 66, 70 or 72, the positions of the attenuators can be set by suitable drives that are controlled, for example, by the CPU programmed or set to achieve the desired attenuation of the beams of radiation.

Figure 10:
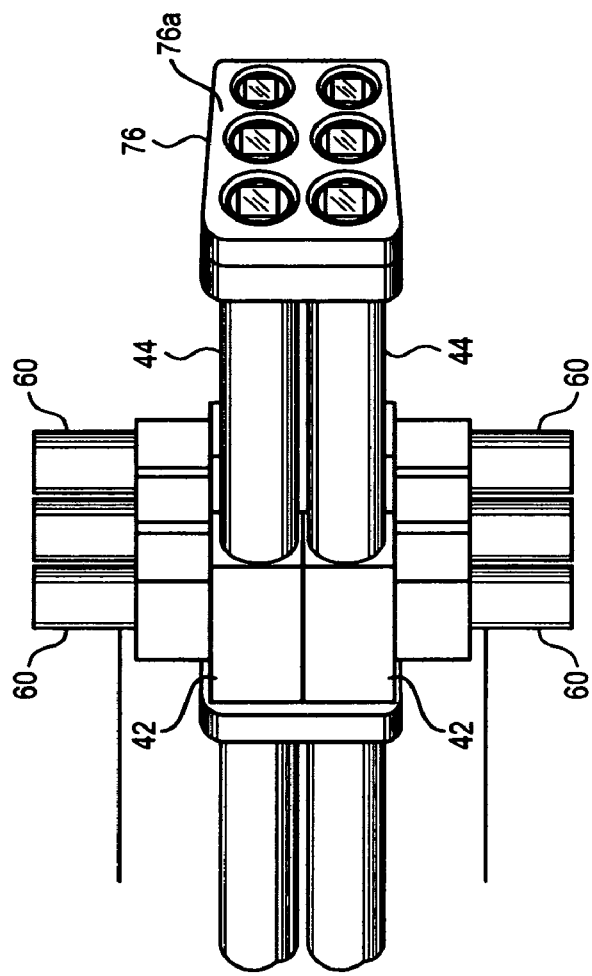
FIG. 10 is a perspective view of the probe end of a sunlight simulator constructed in accordance with the present invention.
Figure 10A:
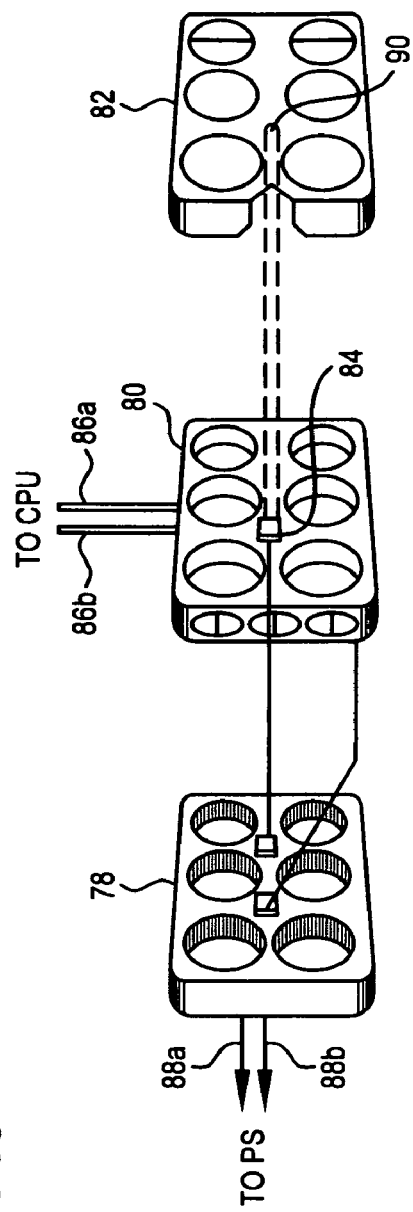
FIG. 10A is an exploded perspective view of a portion of the FIG. 10 probe end of a sunlight simulator.

Referring to FIGS. 10 and 10A, the ends of optical homogenizer units 44 are fixed in a block 76 that is adapted to be placed against a subject that is to be exposed to the radiation provided by the homogenizers units. Preferably, the subject contact surface 76a of block 76 is treated so that the subject experiences no discomfort (e.g., abrasion, temperature extremes, etc.) when the subject contact surface 76a is placed against the subject and the subject is exposed to radiation having uniform output intensity profiles measured across the ends of the optical homogenizer units.

As shown most clearly in FIG. 10A, for the embodiment of the probe end being described, block 76 is composed of a heat sink 78, a cooling source 80, and a front cover 82. The ends of optical homogenizer units 44 are brought together and fitted in block 76. Heat sink 78, cooling source 80, and front cover 82 have aligned openings through which optical homogenizer units 44 project, so that a subject receives the radiation provided by the optical homogenizer units.

Heat sink 78 serves to relieve heat generated both by artifact infrared radiation and heat dispelled by block 76. Cooling source 80, preferably a Peltier device, is electrically polar oriented such that the surface of the cooling source facing the output remains a cooling surface. Cooling source 80 has means for developing an indication of the skin temperature of the subject that controls the temperature of the cooling source. Such means, represented by reference numeral 84, can include a temperature sensor, a thermocouple, or a resistance temperature detector, a pair of lead wires 86a, 86b connected to the CPU, and a pair of lead wires 88a, 88b from the system power supply (PS). The signals from sensing means 84 are conducted to the CPU which, in turn, controls the system power supply to maintain cooling source 80 at the desired temperature. Front cover 82, preferably composed of a high dielectric, medically acceptable polymer that is non-reactive to the skin of a subject and has high resistance to electrical transmission and high thermal conductivity, has an opening 90 through which the sensing means 84 in cooling source 80 are exposed to the skin of the subject to develop an indication of the skin temperature of the subject.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A sunlight simulator comprising:
   a housing;
   a light source positioned within said housing;
   light collecting means for developing from radiation emitted from said light source a plurality of beams of radiation, each within a selected portion of the spectrum of wave lengths of radiation emitted from said light source;
   a plurality of light guides, each positioned to receive individually from said light collecting means one of the beams of radiation, for conducting the beams of radiation away from said light collecting means;
   a plurality of optical homogenizer units, each positioned to receive individually from one of said light guides one of the beams of radiation, for providing a plurality of adjustably positionable beams of radiation having uniform output intensity profiles measured across the ends of said optical homogenizer units; and
   dosage regulating means for controlling the doses of radiation provided by said optical homogenizer units.

2. A sunlight simulator according to claim 1 wherein said light guides are liquid light guides and said light collecting means surround said light source.

3. A sunlight simulator according to claim 2 wherein said light collecting means include:
   (a) a plurality of collimating lens assemblies equidistantly spaced radially from and around said light source, each collimating lens assembly directing a portion of the radiation emitted from said light source radially outward therefrom, and
   (b) a plurality of dichroic mirrors, one associated with each collimating lens and in substantial radial alignment with the associated collimating lens, disposed at an angle to reflect only ultraviolet radiation emitted by said light source to said liquid light guides.

4. A sunlight simulator according to claim 3 wherein said light collecting means further include a plurality of blocking filters, one associated with each dichroic mirror, in the paths of ultraviolet radiation reflected by said dichroic mirrors, for removing short ultraviolet radiation therefrom.

5. A sunlight simulator according to claim 3 further including:
   (a) a block in which said ends of said optical homogenizer units are fitted and adapted to contact the skin of a subject to which radiation from said optical homogenizer units is to be provided, and
   (b) means for controlling the temperature of said block.

6. A sunlight simulator according to claim 1 wherein said light guides are fiber optic light guides and said light collecting means include the input ends of said fiber optic light guides.

7. A sunlight simulator according to claim 6 wherein said light collecting means further include:
   (a) a reflector for reflecting a portion of the radiation emitted from said light source,
   (b) a first dichroic mirror disposed at an angle to reflect only ultraviolet radiation emitted by said light source and ultraviolet radiation reflected from said reflector,
   (c) a second dichroic mirror disposed at an angle to reflect only ultraviolet radiation reflected from said first dichroic mirror, and
   (d) a collimating lens assembly positioned to direct ultraviolet radiation reflected by said second dichroic mirror to said input ends of said fiber optic light guides.

8. A sunlight simulator according to claim 7 wherein said light collecting means further include a blocking filter in the path of ultraviolet radiation reflected from said first dichroic mirror to said second dichroic mirror for removing short ultraviolet radiation therefrom.

9. A sunlight simulator according to claim 7 further including:
   (a) a block in which said ends of said optical homogenizer units are fitted and adapted to contact the skin of a subject to which radiation from said optical homogenizer units is to be provided, and
   (b) means for controlling the temperature of said block.

10. A sunlight simulator according to claim 1 wherein said dosage regulating means include control means for individually blocking each beam of radiation received by said optical homogenizer units at prescribed times.

11. A sunlight simulator according to claim 10 wherein the control means include:
    (a) a plurality of shutter assemblies, one associated with each of said optical homogenizer units, and each shutter assembly includes:
       (1) a shutter movable between a first position for allowing a beam of radiation to pass therethrough and a second position for blocking passage of the beam of radiation therethrough,
       (2) a solenoid plunger to which said shutter is affixed and with which said shutter is movable between said first position and said second position, and (3) a solenoid for moving said solenoid plunger and said shutter between said first position and said second position, and (b) a timing circuit for individually actuating said solenoids to move said shutters to said second positions to block each beam of radiation received by said optical homogenizer units at prescribed times.

12. A sunlight simulator according to claim 11 wherein each of said shutter assemblies is positioned between one of said light guides and one of said optical homogenizer units.

13. A sunlight simulator according to claim 11 wherein each of said shutter assemblies is positioned between said light collecting means and one of said light guides.

14. A sunlight simulator according to claim 1 further including attenuator means for individually and selectively regulating the intensity of each of the beams of radiation.

15. A sunlight simulator according to claim 14 wherein said attenuator means include a plurality of individual attenuators, one associated with each beam of radiation developed by said light collecting means, with each attenuator disposed between one of said light collecting means and said optical homogenizer unit associated with said light collecting means and being individually adjustable to selectively restrict the amount of radiation received by said associated optical homogenizer unit.

16. A sunlight simulator according to claim 15 wherein:
(a) said light guides are liquid light guides, and
(b) said attenuators are disposed between said light collecting means and said liquid light guides.

17. A sunlight simulator according to claim 15 wherein said attenuators are disposed between said light guides and said optical homogenizer units.

18. A sunlight simulator according to claim 17 wherein said light guides are fiber optic light guides.

19. A sunlight simulator according to claim 1 wherein each optical homogenizer unit includes:
(a) an elongated tube,
(b) a multi-sided elongated optical homogenizer having a length equal to the length of said tube and positioned within said tube, and
(c) filler material in the spaces between the longitudinal surfaces of said optical homogenizer and said inner surface of said tube.

20. A sunlight simulator according to claim 19 wherein:
(a) said optical homogenizer includes:
(1) a multisided elongated quartz core member having a length equal to the length of said tube, and
(2) an evaporated aluminum coating on said longitudinal surfaces of said quartz member, and
(b) said optical homogenizer unit further includes an epoxy sealer layer on said evaporated aluminum coating of said optical homogenizer.

21. A sunlight simulator according to claim 20 wherein said tube has a circular cross-section and said optical homogenizer has a square cross-section.

22. A sunlight simulator according to claim 20 wherein said filler material is a medical grade sealing material.

23. A sunlight simulator comprising:
a housing;
a light source positioned within said housing;
light collecting means for developing from radiation emitted from said light source a plurality of beams of radiation, each within a selected portion of the spectrum of wave lengths of radiation emitted from said light source;
a plurality of light guides, each positioned to receive individually from said light collecting means one of the beams of radiation, for conducting the beams of radiation away from said light collecting means;
a plurality of optical homogenizer units, each positioned to receive individually from one of said light guides one of the beams of radiation, for providing a plurality of adjustably positionable beams of radiation having uniform output intensity profiles measured across the ends of said optical homogenizer units; and
dosage regulating means for controlling the doses of radiation provided by said optical homogenizer units and including:
(a) a sensor, positioned between one of said light guides and one of said optical homogenizer units transverse to the beam of radiation received by said one optical homogenizer unit, for monitoring the intensity of the beam of radiation received by said one optical homogenizer unit, and
(b) control means responsive to said sensor for individually blocking the passage of the beams of radiation received by said optical homogenizer units when the doses of radiation provided by said optical homogenizer units reach preset levels.

24. A sunlight simulator according to claim 23 wherein said control means include:
(a) a plurality of shutter assemblies, one associated with each of said optical homogenizer units, and each shutter assembly includes:
(1) a shutter movable between a first position for allowing a beam of radiation to pass therethrough and a second position for blocking passage of the beam of radiation therethrough,
(2) a solenoid plunger to which said shutter is affixed and with which said shutter is movable between said first position and said second position, and
(3) a solenoid for moving said solenoid plunger and said shutter between said first position and said second position, and
(b) means responsive to said sensor for individually actuating said solenoids to move said shutters to said second positions to block the beams of radiation passing through said shutter assemblies when the doses of radiation provided by said associated optical homogenizer units reach the preset levels.

25. A sunlight simulator according to claim 24 wherein each of said shutter assemblies is positioned between one of said light guides and one of said optical homogenizer units.

26. A sunlight simulator according to claim 24 wherein each of said shutter assemblies is positioned between said light collecting means and one of said light guides.

27. A sunlight simulator according to claim 23 wherein said control means are positioned between said light collecting means and said light guides.

28. A sunlight simulator comprising:
a housing;
a light source positioned within said housing;
light collecting means for developing from radiation emitted from said light source a plurality of beams of radiation, each within a selected portion of the spectrum of wave lengths of radiation emitted from said light source;
a plurality of light guides, each positioned to receive individually from said light collecting means one of the beams of radiation, for conducting the beams of radiation away from said light collecting means;
a plurality of optical homogenizer units, each positioned to receive individually from one of said light guides one of the beams of radiation, for providing a plurality of adjustably positionable beams of radiation having uniform output intensity profiles measured across the ends of said optical homogenizer units; and dosage regulating means for controlling the doses of radiation provided by said optical homogenizer units and including:
(a) a plurality of sensors, each associated with one of said optical homogenizer units and positioned between one of said light guides and one of said optical homogenizer units transverse to the beam of radiation received by said one optical homogenizer unit, for individually monitoring the intensity of the beams of radiation received by said optical homogenizer units, and
(b) a plurality of control means individually responsive to one of said sensors for individually blocking the passage of the beams of radiation received by said optical homogenizer units when the doses of radiation provided by said optical homogenizer units reach preset levels.

29. A sunlight simulator according to claim 28 wherein said control means include:
(a) a plurality of shutter assemblies, one associated with each of said optical homogenizer units, and each shutter assembly includes:
  (1) a shutter movable between a first position for allowing a beam of radiation to pass therethrough and a second position for blocking passage of the beam of radiation therethrough,
  (2) a solenoid plunger to which said shutter is affixed and with which said shutter is movable between said first position and said second position, and
  (3) a solenoid for moving said solenoid plunger and said shutter between said first position and said second position, and
(b) means responsive to said sensors for individually actuating said solenoids to move said shutters to said second positions to block the beams of radiation passing through said shutter assemblies when the doses of radiation provided by said associated optical homogenizer units reach the preset levels.

30. A sunlight simulator according to claim 29 wherein each of said shutter assemblies is positioned between one of said light guides and one of said optical homogenizer units.

31. A sunlight simulator according to claim 29 wherein each of said shutter assemblies is positioned between said light collecting means and one of said light guides.

32. A sunlight simulator according to claim 28 wherein each of said control means is positioned between said light collecting means and one of said light guides.

33. A sunlight simulator comprising:
a housing;
a light source positioned within said housing;
light collecting means for developing from radiation emitted from said light source a plurality of beams of radiation, each within a selected portion of the spectrum of wave lengths of radiation emitted from said light source;
a plurality of light guides, each positioned to receive individually from said light collecting means one of the beams of radiation, for conducting the beams of radiation away from said light collecting means;
a plurality of optical homogenizer units, each positioned to receive individually from one of said light guides one of the beams of radiation, for providing a plurality of adjustably positionable beams of radiation having uniform output intensity profiles measured across the ends of said optical homogenizer units;
dosage regulating means for controlling the doses of radiation provided by said optical homogenizer units; and
attenuator means for individually and selectively regulating the intensity of each of the beams of radiation and including:
(a) a plurality of individual attenuators, one associated with each beam of radiation developed by said light collecting means, with each attenuator:
  (1) disposed between one of said light guides and said optical homogenizer unit associated with said light and being individually adjustable to selectively restrict the amount of radiation received by said associated optical homogenizer unit, and
  (2) having through openings that vary in size to vary the intensity of a beam of radiation passing through said attenuator, and
(b) means for moving said attenuators to selectively regulate the intensity of the beam of radiation passing therethrough.

34. A sunlight simulator according to claim 33 wherein said through openings are horizontal spaces.

35. A sunlight simulator according to claim 33 wherein said through openings are horizontal rows of circular openings.

36. A sunlight simulator comprising:
a housing;
a light source positioned within said housing;
light collecting means for developing from radiation emitted from said light source a plurality of beams of radiation, each within a selected portion of the spectrum of wave lengths of radiation emitted from said light source;
a plurality of light guides, each positioned to receive individually from said light collecting means one of the beams of radiation, for conducting the beams of radiation away from said light collecting means;
a plurality of optical homogenizer units, each positioned to receive individually from one of said light guides one of the beams of radiation, for providing a plurality of adjustably positionable beams of radiation having uniform output intensity profiles measured across the ends of said optical homogenizer units; and
dosage regulating means for controlling the doses of radiation provided by said optical homogenizer units; and
attenuator means for individually and selectively regulating the intensity of each of the beams of radiation and including:
(a) a plurality of individual attenuators, one associated with each beam of radiation developed by said light collecting means, with each attenuator:
  (1) disposed between one of said light guides and said optical homogenizer unit associated with said light guide and being individually adjustable to selectively restrict the amount of radiation received by said associated optical homogenizer unit, and
  (2) a spring, and
(b) means for compressing and expanding said spring to selectively regulate the intensity of the beam of radiation passing therethrough.

37. A sunlight simulator comprising:
a housing;
a light source positioned within said housing;
light collecting means for developing from radiation emitted from said light source a beam of radiation within a selected portion of the spectrum of wave lengths of radiation emitted from said light source;
a fiber optic light guide positioned to receive from said light collecting means the beam of radiation for conducting the beam of radiation away from said light collecting means;

an optical homogenizer unit positioned to receive from said fiber optic light guide the beam of radiation for providing an adjustably positionable beam of radiation having a uniform output intensity profile measured across the end of said optical homogenizer unit; and dosage regulating means for controlling the dose of radiation provided by said optical homogenizer unit.

38. A sunlight simulator according to claim 37 wherein said light collecting means include:
  (a) a reflector for reflecting a portion of the radiation emitted from said light source,
  (b) a first dichroic mirror disposed at an angle to reflect only ultraviolet radiation emitted by said light source and ultraviolet radiation reflected from said reflector,
  (c) a second dichroic mirror disposed at an angle to reflect only ultraviolet radiation reflected from said first dichroic mirror, and
  (d) a collimating lens assembly positioned to direct ultraviolet radiation reflected by said second dichroic mirror to said input ends of said fiber optic light guides.

39. A sunlight simulator according to claim 38 wherein said light collecting means further include a blocking filter in the path of ultraviolet radiation reflected from said first dichroic mirror to said second dichroic mirror for removing short ultraviolet radiation therefrom.

40. A sunlight simulator comprising:
a housing;
a light source positioned within said housing;
light collecting means:
  (a) surrounding said light source for developing from radiation emitted from said light source a plurality of beams of radiation, each within a selected portion of the spectrum of wave lengths of radiation emitted from said light source, and
  (b) including:
    (1) a plurality of collimating lens assemblies equidistantly spaced radially from and around said light source, each collimating lens assembly directing a portion of the radiation emitted from said light source radially outward therefrom, and
    (2) a plurality of dichroic mirrors, one associated with each collimating lens and in substantial radial alignment with the associated collimating lens, disposed at an angle to reflect only ultraviolet radiation emitted by said light source to said liquid light guides;
a plurality of liquid light guides, each positioned to receive individually from said light collecting means one of the beams of radiation, for conducting the beams of radiation away from said light collecting means;
a plurality of optical homogenizer units, each positioned to receive individually from one of said light guides one of the beams of radiation, for providing a plurality of adjustably positionable beams of radiation having uniform output intensity profiles measured across the ends of said optical homogenizer units; and
dosage regulating means for controlling the doses of radiation provided by said optical homogenizer units;
a block:
  (a) in which said ends of said optical homogenizer units are fitted,
  (b) adapted to contact the skin of a subject to which radiation from said optical homogenizer units is to be provided, and
  (c) including:
    (1) a heat sink for relieving heat generated by artifact infrared radiation and heat dispelled by said block,
    (2) an electrically polar oriented cooling source having a surface facing the subject and sensing means for developing an indication of the skin temperature of the subject for controlling the temperature of said cooling source, and
    (3) a high dielectric polymer front cover having a high resistance to electrical transmission, high thermal conductivity, and an opening through which said sensing means in said cooling source are exposed to the skin of the subject; and
means for controlling the temperature of said block.

41. A sunlight simulator comprising:
a housing;
a light source positioned within said housing;
light collecting means for developing from radiation emitted from said light source a plurality of beams of radiation, each within a selected portion of the spectrum of wave lengths of radiation emitted from said light source, and including;
  (a) a reflector for reflecting a portion of the radiation emitted from said light source,
  (b) a first dichroic mirror disposed at an angle to reflect only ultraviolet radiation emitted by said light source and ultraviolet radiation reflected from said reflector,
  (c) a second dichroic mirror disposed at an angle to reflect only ultraviolet radiation reflected from said first dichroic mirror, and
  (d) a collimating lens assembly positioned to direct ultraviolet radiation reflected by said second dichroic mirror to said input ends of said fiber optic light guides;
a plurality of fiber optic light guides each:
  (a) positioned to receive individually from said light collecting means one of the beams of radiation, for conducting the beams of radiation away from said light collecting means, and
  (b) having an input end included in said light collecting means;
a plurality of optical homogenizer units, each positioned to receive individually from one of said light guides one of the beams of radiation, for providing a plurality of adjustably positionable beams of radiation having uniform output intensity profiles measured across the ends of said optical homogenizer units;
dosage regulating means for controlling the doses of radiation provided by said optical homogenizer units; and
a block:
  (a) in which said ends of said optical homogenizer units are fitted,
  (b) adapted to contact the skin of a subject to which radiation from said optical homogenizer units is to be provided, and
  (c) including:
    (1) a heat sink for relieving heat generated by artifact infrared radiation and heat dispelled by said block,
    (2) an electrically polar oriented cooling source having a surface facing the subject and sensing means for developing an indication of the skin temperature of the subject for controlling the temperature of said cooling source, and
    (3) a high dielectric polymer front cover having a high resistance to electrical transmission, high thermal conductivity, and an opening through which said sensing means in said cooling source are exposed to the skin of the subject, and
means for controlling the temperature of said block.

* * * * *

UNITED STATES PATENT AND TRADEMARK OFFICE
CERTIFICATE OF CORRECTION

PATENT NO. : 7,657,147 B2 Page 1 of 1
APPLICATION NO. : 11/366272
DATED : February 2, 2010
INVENTOR(S) : Michael H. Bonitatibus et al.

It is certified that error appears in the above-identified patent and that said Letters Patent is hereby corrected as shown below:

Column 14,
Line 8, "said light" should be -- said light guide --.

Signed and Sealed this

Eleventh Day of May, 2010

David J. Kappos
*Director of the United States Patent and Trademark Office*